United States Patent [19]

Heuberger

[11] 4,406,431
[45] Sep. 27, 1983

[54] AIR SCOOP LIP WARMER DE-ICING SYSTEM

[75] Inventor: Lawrence K. Heuberger, Reno, Nev.

[73] Assignee: Omac, Inc., Reno, Nev.

[21] Appl. No.: 324,312

[22] Filed: Nov. 23, 1981

[51] Int. Cl.³ .................. B64D 33/02; B64D 15/02; F02C 7/045

[52] U.S. Cl. .............. 244/53 B; 60/39.093; 244/134 R; 244/134 B

[58] Field of Search ............ 244/13, 53 B, 134 R, 244/134 B; 60/39.09 D, 39.093

[56] References Cited

U.S. PATENT DOCUMENTS

| | | | |
|---|---|---|---|
| 2,655,308 | 10/1953 | Luttman | 60/39.09 D |
| 3,938,761 | 2/1976 | Hempenstall | 244/13 |
| 3,981,466 | 9/1976 | Shah | 244/134 R |
| 4,240,250 | 12/1980 | Harris | 60/39.09 D |

OTHER PUBLICATIONS

*Jane's All The World's Aircraft*, 1977-1978, Edition, Cessna 337 and 337 P Skymaster.

*Primary Examiner*—Charles E. Frankfort
*Attorney, Agent, or Firm*—Sughrue, Mion, Zinn, Macpeak and Seas

[57] ABSTRACT

An elongated air scoop integrated with the engine housing for a jet prop powered aircraft is provided with a thin tubular metal manifold loop fitted to the open forward end of the air scoop and the hot exhaust gas bled from the engine exhaust system is continuously fed through the tubular loop which forms a hot defrost lip for the air scoop.

2 Claims, 5 Drawing Figures

AIR SCOOP LIP WARMER DE-ICING SYSTEM

BACKGROUND OF THE INVENTION

This invention relates to prevention of ice build-up at the intake end of air scoops or similar devices for feeding air to internal combustion engines for jet prop powered aircraft and the like.

The leading edges of aircraft wings and other components are subjected during certain flight conditions to the tendency of build-up of relatively thick layers of ice which add considerable weight to the aircraft, interfere with the air foil configuration of the wings and other components, and reduce speed and thus efficiency of the aircraft. Under extreme conditions the ice may render the aircraft incapable of flight. Whether the aircraft is powered by a piston type internal combustion engine or by a jet engine, either full jet or jet prop, there is a necessity to feed air to the engine for mixing with the fuel to form a combustible mixture. Subsequent to combustion, the expanding products of combustion function to drive the pistons and thus the propeller connected to the engine or in a pure jet powered aircraft, force the aircraft to move forwardly by a reaction to the expanding gases as they are discharged rearwardly of the aircraft engine.

Conventionally, an elongated air scoop forming a projection of the aircraft fuselage, wing or other component and projecting into the air stream is employed in supplying air to the engine. The open forward end of the scoop collects air passing at high speed over the aircraft and the scoop directs the air to the air intake of the engine proper. Ice in building up on the leading edge of the air scoop, interferes with the capability of the air scoop to feed air to the engine and, of course, weighs down the aircraft.

Attempts have been made to incorporate a defrost system to such air scoops by providing an electric boot integrated to the scoop at the inlet end. Such boots may include an electric resistance heater functioning to maintain an exterior temperature to the boot sufficient to melt any ice built up on such surface. Such arrangements have been complicated and expensive and have not performed to full satisfaction.

SUMMARY OF THE INVENTION

The present invention is directed to an improved air scoop lid warmer de-icing system for an aircraft having at least one internal combustion engine mounted thereon for powering of the aircraft and having an elongated air scoop mounted thereto and having a forwardly open end facing the air stream passing over the aircraft for operatively feeding air to the engine from the air scoop to effect a combustible mixture with the engine fuel. Such engines include an exhaust pipe system for exhausting hot exhaust gases. The improvement lies in a tubular metal loop configured to the open end of the scoop and mounted thereto and means for continuously circulating the hot exhaust gases from the engine exhaust pipe system through the tubular metal loop.

Preferably, the tubular metal loop comprises a complete loop of a relatively small diameter metal tube. An inlet tube integrated with the loop at one point, is operatively coupled by a hose to the exhaust pipe of the engine, and an outlet tube integrated to the loop at a point remote from the inlet tube connection opens to the aircraft exterior to discharge the exhaust gas.

Where the aircraft takes the form of a single engine pusher type aircraft and wherein the engine is mounted within the fuselage at the rear of the aircraft, the air scoop loop is of generally rectangular transverse cross-section fitted to the opening within the forward open end of the air scoop which is of like shape. The tubular metal loop comprises a small diameter continuous loop of rectangular shape. The inlet tube is connected to the bottom of the loop at the center thereof, and the outlet tube is connected to the top of the loop, at its center with the end of the outlet tube remote from the loop opening to the exterior of the scoop and flush with the upper surface thereof, rearwardly of the scoop air inlet opening.

DESCRIPTION OF THE PREFERRED EMBODIMENT

Figure 1:
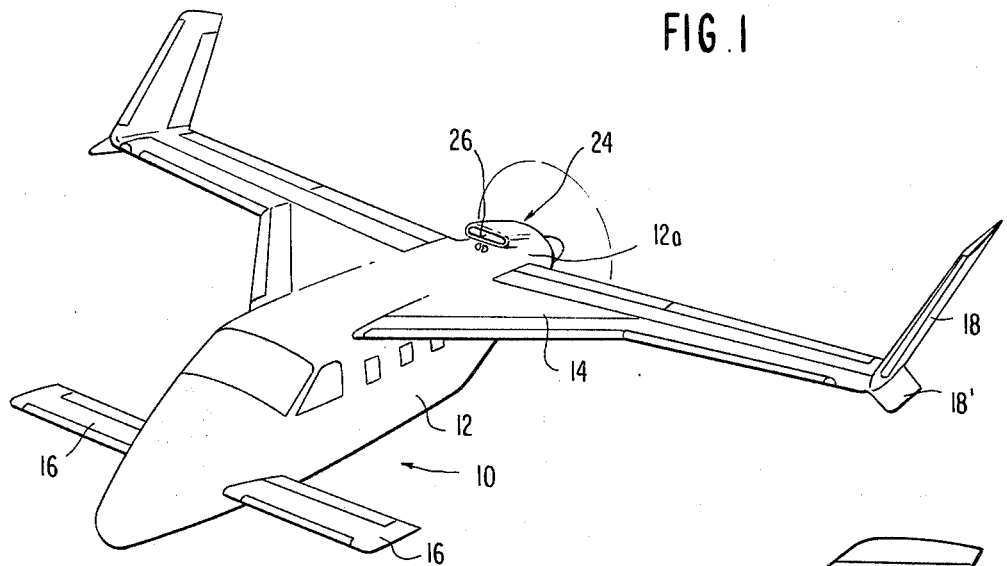
FIG. 1 is a perspective view of a delta wing pusher type canard aircraft bearing the improved air scoop lid warmer de-icing system as one embodiment of the present invention.

Turning to the drawings, there is shown in FIG. 1 a single engine delta wing, canard type aircraft indicated generally at 10.

Figure 2:
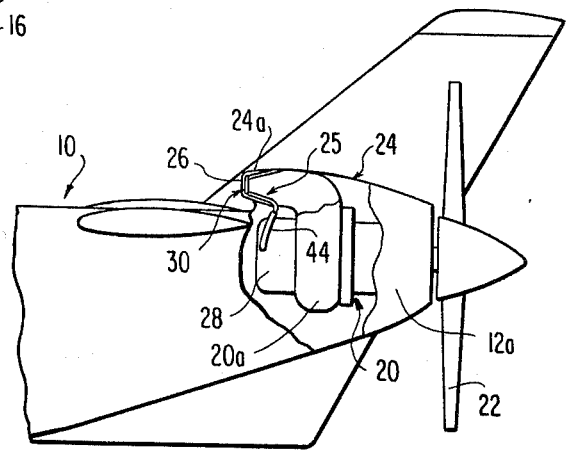
FIG. 2 is a side elevational view, partially broken away, of a portion of the aircraft of FIG. 1, illustrating the lip warmer tubular loop as applied to the open frontal end of the air scoop.

The aircraft as shown, is driven by a prop jet borne by the fuselage 12 at the rear end 12a thereof. The aircraft is of the high wing type, specifically a delta wing 14 is mounted to the fuselage, spanning across the top of the same. The aircraft 10 is not equipped with a conventional horizontal stabilizer. Instead, a pair of canards as at 16, also comprising lifting surfaces of air foil configuration and adding to the lift imparted by the delta wing 14, extend horizontally outwardly from the aircraft near the nose thereof, from respective sides. There is no vertical tail to the fuselage as such. However, the delta wing 14 is provided, at opposite ends, with outwardly and upwardly inclined upper winglets 18 and corresponding downwardly and outwardly inclined lower winglets 18' integrated to the tips of the delta wing 14. At the tail end 12a of the fuselage 12, resides the engine indicated generally at 20, FIG. 2. In this aircraft, the engine may comprise a Lycoming LTP 101-700A-1 jet prop engine driving a propeller 22 and functioning to push the aircraft. Portion 12a of the fuselage, therefore, acts as an engine housing for engine 20.

While not germane to the present invention, the engine 20 is characterized by a radial air inlet 20a intermediate of its ends feeding to a simplified, annular combuster system concentrically surrounding a single stage gas generator and power turbine with single axial and centrifugal compressor stages between the single stage gas generator and power turbine section and the propeller itself (all not shown). The engine discharge of the combustion gases is forwardly of the aircraft at the axial exit point from the engine per se. However, the discharge gases are reversely directed through a C-shaped exhaust pipe indicated at 28 for exhaust rearwardly of the aircraft and to one side of the fuselage engine housing section 12a through a discharge duct 28a acting as the termination of the exhaust pipe 28.

In order to feed air to the engine radial air inlet and thence to the annular combustion chamber, an elongated air scoop indicated generally at 24 is provided to the aircraft fuselage at aft section 12a, overlying that portion of the fuselage housing the engine 20. Air scoop 24 may be formed of metal or molded fiberglass reinforced resin. Its function is to collect air from the air stream moving over the aircraft during flight and feeding it to the radial air inlet 20a of engine 20. As such, it is closed except for a modified, transversely elongated opening 26 of irregular rectangular configuration, functioning as a combustion air inlet for tube 24, as its forward end 24a.

Air, once entering the air scoop 24, passes to the radial air inlet 20a leading to the combustion chamber for the gas turbine engine, however its flow path is not material to the present invention.

Figure 3:
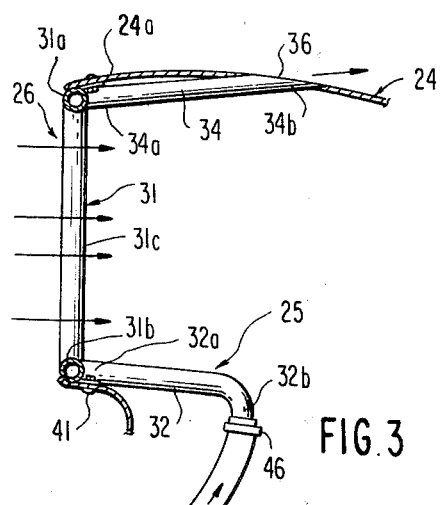
FIG. 3 is an enlarged sectional view of the air scoop lip warmer de-icing system of the present invention and its connection to the exhaust pipe of the aircraft engine.
Figure 5:
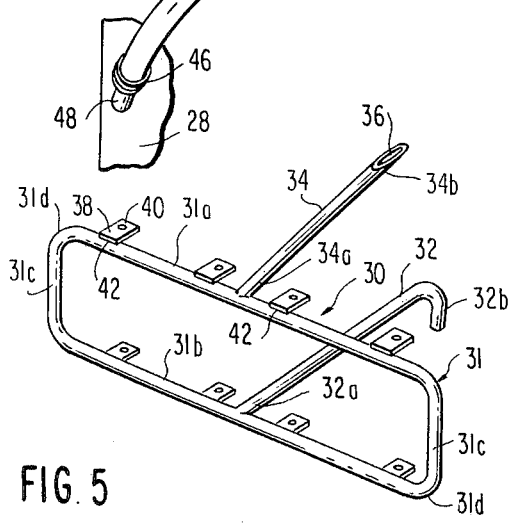
FIG. 5 is a perspective view of the tubular metal loop assembly prior to installation.
Figure 4:
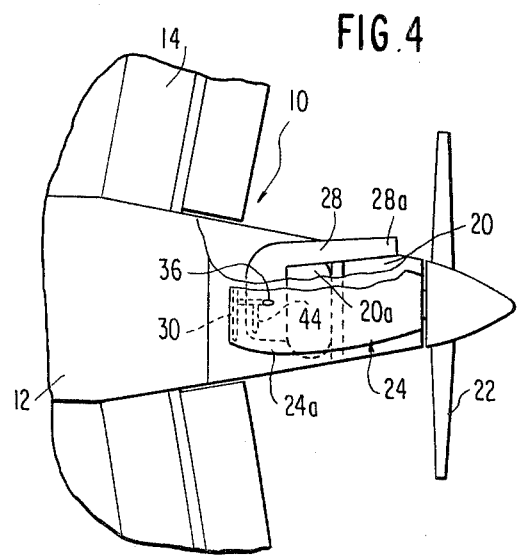
FIG. 4 is a top plan view, partially broken away, of the portion of the aircraft shown in FIG. 2.

As may be appreciated from the discussion above, during flight, there is a tendency for ice to accumulate about the inlet opening 26 at the forward end 24a of air scoop 24. The present invention is directed to an improved air scoop lip warmer de-icing system indicated generally at 25, FIG. 3 and in that respect, the principal component of the system is a hot air tube assembly indicated generally at 30, FIG. 5 comprising a continuous loop small diameter metal tube loop indicated generally at 31 of transversely elongated generally rectangular configuration and including integrally, a top portion 31a, a bottom portion 31b, and laterally opposed vertical side portions 31c. Due to the streamlining of the air scoop 24, the vertical side portions 31c merge into the horizontal top and bottom portions 31a, 31b to form rounded corners as at 31d. Additionally, assembly 30 includes a generally L-shaped intake tube 32, of similar diameter having one end 32a welded to the bottom horizontal portion 31b of the loop 31, at its center, while the vertical bent portion 32b projects vertically downwardly therefrom and to the rear of scoop inlet opening 26 when the tubular manifold assembly is mounted to the air scoop 24 and integrated therewith so as to actually define opening 26 within the air scoop, FIG. 3.

Further, an outlet tube 34 takes the form of a straight section and is welded at one end 34a, to the loop 31 at the center of the upper horizontal portion 31a and diametrically opposite the point where the lower tube 32 is welded to the same loop. Additionally, the outlet tube 34 is inclined upwardly and rearwardly of the loop 31, which loop occupies a vertical plane when installed the outlet tube 34, and tube 34 terminating at its rearward end 34b in an oblique discharge port 36 which lies flush with the outer surface of scoop 24, at the top thereof and to the rear of forward end 34a.

In order to fixedly mount the assembly 30 to the open end of the air scoop 24, in the illustrated embodiment, a plurality of metal tabs 38 project from the loop 31 to the rear thereof. The tabs may be welded as at 42 to the outside of the tubular loop 31 and the tabs may bear holes as at 40 for receiving screws, bolts or the like 41 for mechanically fixing the loop portion of the tubular assembly to the scoop 24 at the forward end 24a thereof. Other fixing means may be employed. The tubular assembly 30 may or may not be removable. It could be integrated into the air scoop 24 during its manufacture.

If scoop 24 is formed of fiberglass reinforced resin, the loop 31 could be molded into the body of the air scoop 24.

Preferably, the end 32b of the inlet tube 32 is coupled by way of hose 44 to the exhaust pipe 28. In that respect, a hose clamp 46 functions to removably couple one end of hose 44 to the inlet tube portion 32b, the opposite end of hose 44 being coupled in similar fashion, by a second hose clamp 46, to a projecting nipple 48 which opens to the interior of the exhaust pipe 28 leading from engine 20. This connection is purely exemplary and other means may be provided for feeding the exhaust gases constituting the hot products of combustion from the engine through assembly 30 for maintaining the inlet opening 26 of the air scoop frost free. Loop 31 may take other than modified rectangular form. It could be purely rectangular or oval depending upon the configuration required for opening 26 within the air scoop and the configuration of the air scoop 24 itself. The assembly 30 may be comprised of a light weight metal such as an aluminum alloy or the like. The function is primarily to supply adequate heat to maintain the opening of the air scoop 24 frost free rather than performing a structural support function for air scoop 24.

While the invention has been particularly shown and described with reference to a preferred embodiment thereof, it will be understood by those skilled in the art that various changes in form and details may be made therein without departing from the spirit and scope of the invention.

What is claimed is:

1. An improved air scoop lip warmer de-icing system for an aircraft having at least one internal combustion engine mounted thereon for powering of said aircraft and having an elongated air scoop mounted thereto with a forwardly open end facing the air stream passing over the aircraft for operatively feeding air to the engine from the air scoop to effect a combustible mixture with engine fuel, and wherein said engine includes an exhaust pipe system for exhausting hot exhaust gases, said system comprising:
 a tubular metal loop configured to the open end of said air scoop, mounted to the interior of said air scoop adjacent said open end at the edge thereof, said tubular metal loop comprising a complete loop of relatively small diameter metal tubing,
 an inlet tube integral with said loop, extending away from said open end of said air scoop and within said air scoop,
 a hose clamped at one end to said inlet tube and at the other end to said exhaust pipe of said engine,
 an outlet tube integral with said loop at a point within said loop remote from said inlet tube, said outlet tube extending away from the open end of said air scoop and projecting through said air scoop wall rearwardly of the air scoop opening with said outlet tube open to the aircraft exterior on the surface of the elongate air scoop remote from the open end thereof, such that the exhaust gases bled from said exhaust pipe feeds to the loop through said inlet tube, divides at the intersection of said inlet tube and said loop, transverses portions of said loop as a split flow and joined at the connection of said outlet tube of said loop for common exhaust to the aircraft exterior.

2. An improved air scoop lip warmer de-icing system for an aircraft, said aircraft having at least one internal combustion engine mounted thereon for powering said aircraft and having an elongated air scoop mounted thereto with a forwardly open end facing the air stream passing over the aircraft for operatively feeding air to the engine from said air scoop to effect a combustible mixture with the engine fuel, and wherein said engine includes an exhaust pipe system for exhausting hot exhaust gases, said de-icing system comprising:

a tubular metal loop configured to the open end of said air scoop, mounted to said air scoop and extending about the interior of said air scoop at the edge thereof, said aircraft taking the form of a single engine pusher type aircraft, said engine being mounted within the fuselage at the rear of the aircraft, said air scoop being of generally oval transverse cross-section, said opening within said air scoop being of generally rectangular cross-section, said tubular loop being of similar generally rectangular cross-section and sized to said air scoop opening to closely fit to said air scoop at the open inlet end thereof, said tubular metal loop comprising a small diameter continuous loop tube, an inlet tube connected to the bottom of the loop at the center thereof, an outlet tube being connected to the top of the loop at one end, said outlet tube extending within said air scoop away from said loop and having the other end of the outlet tube projecting through said air scoop and terminating flush with the upper surface thereof, rearwardly of the air scoop inlet opening, and said inlet tube being connected to the exhaust pipe of said engine such that exhaust gas bled from the exhaust gas pipe feeds to the loop, devices at the intersection of said inlet tube and said loop, traverses portions of said loop as a split flow and joins at the connection of said outlet tube to said loop for common exhaust to the aircraft exterior.

* * * * *